US011332193B2

(12) United States Patent
Schmitt et al.

(10) Patent No.: US 11,332,193 B2
(45) Date of Patent: May 17, 2022

(54) CROSSMEMBER ARRANGEMENT

(71) Applicant: Dr. Ing. h.c. F. Porsche Aktiengesellschaft, Stuttgart (DE)

(72) Inventors: Hans-Jürgen Schmitt, Muehlacker (DE); Björn Dunst, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 204 days.

(21) Appl. No.: 16/823,572

(22) Filed: Mar. 19, 2020

(65) Prior Publication Data
US 2020/0307696 A1    Oct. 1, 2020

(30) Foreign Application Priority Data

Mar. 27, 2019  (DE) ...................... 10 2019 107 864.4

(51) Int. Cl.
*B62D 21/03* (2006.01)
*B62D 27/06* (2006.01)
*B62D 25/04* (2006.01)
*B62D 25/08* (2006.01)
B62D 21/15 (2006.01)
B60R 21/13 (2006.01)

(52) U.S. Cl.
CPC ............ *B62D 21/03* (2013.01); *B62D 25/04* (2013.01); *B62D 25/08* (2013.01); *B62D 27/06* (2013.01); *B60R 21/13* (2013.01); *B60R 2021/132* (2013.01); *B62D 21/157* (2013.01); *B62D 27/065* (2013.01)

(58) Field of Classification Search
CPC ........ B62D 21/03; B62D 27/06; B62D 25/08; B62D 25/04; B62D 21/157; B62D 27/065; B60R 21/13; B60R 2021/132

USPC .......................................................... 296/204
See application file for complete search history.

(56) References Cited

U.S. PATENT DOCUMENTS 5,613,727 A * 3/1997 Yamazaki ............... B62D 25/02
                                                        296/187.12
8,308,227 B2 * 11/2012 Tsuruta ................. B62D 21/157
                                                        296/209

FOREIGN PATENT DOCUMENTS

DE          102014113619 A1      3/2016

* cited by examiner

*Primary Examiner* — D Glenn Dayoan
*Assistant Examiner* — Dana D Ivey
(74) *Attorney, Agent, or Firm* — RatnerPrestia

(57) ABSTRACT

A crossmember arrangement for reinforcing a motor-vehicle body includes a crossmember for dissipating loads in the Y direction, an intermediate piece, which is connected directly or indirectly to the crossmember and is intended for fastening the crossmember to a supporting pillar, in particular a B pillar, and a fastening body, which is connected to the intermediate piece and is intended for butting with surface-area contact against the supporting pillar. The fastening body is configured in the form of a chamber profile which runs predominantly in the Y direction. Dissipation of high loads in a motor-vehicle body is made possible, along with straightforward installation capability of the crossmember arrangement in the motor-vehicle body, as a result of the fastening body of the crossmember arrangement, the fastening body is configured in the form of a chamber profile, running essentially in the Y direction.

19 Claims, 2 Drawing Sheets

CROSSMEMBER ARRANGEMENT

CROSS-REFERENCE TO RELATED APPLICATION

This application claims priority to German Patent Application No. 10 2019 107 864.4, filed Mar. 27, 2019, the content of such application being incorporated by reference herein in its entirety.

FIELD OF THE INVENTION

The invention relates to a crossmember arrangement which can help to reinforce a motor-vehicle body in order to protect vehicle occupants in the event of an accident.

DE 10 2014 113 619 A1, which is incorporated by reference herein, discloses a crossmember arrangement which is configured in the form of a rollover bar and in the case of which a crossmember is fastened to a flat fastening plate, which butts with surface-area contact against a B pillar, via a U-shaped intermediate piece, which is open in the X direction, wherein the fastening plate can be screwed to the B pillar.

BACKGROUND OF THE INVENTION

There is a constant need for it to be possible, along with straightforward installation capability, to dissipate high loads in a motor-vehicle body.

SUMMARY OF THE INVENTION

In view of the foregoing, it would be desirable to dissipate high loads in a motor-vehicle body, along with straightforward installation capability.

Described herein is a crossmember arrangement for reinforcing a motor-vehicle body, having a crossmember for dissipating loads in the Y direction, having an intermediate piece, which is connected directly or indirectly to the crossmember and is intended for fastening the crossmember to a supporting pillar, in particular a B pillar, and having a fastening body, which is connected to the intermediate piece and is intended for butting against the supporting pillar, wherein the fastening body is configured in the form of a chamber profile which runs predominantly in the Y direction.

Since the crossmember, rather than being connected to the supporting pillar directly, is connected to the supporting pillar indirectly via the intermediate piece and the fastening body, it is possible to compensate for a manufacturing-tolerance-induced offset in the Y direction at the location where fastening to the intermediate piece takes place. This facilitates installation of the crossmember arrangement with a minimal amount of play, in particular with play eliminated altogether, between two supporting pillars located opposite one another in the Y direction, and facilitates clamping of the crossmember arrangement in particular with prestressing in the Y direction. The intermediate piece is produced, in particular, with a lightweight construction. The intermediate piece can be configured in the form of a multi-chamber profile, wherein in particular the chambers of the intermediate piece run predominantly in the Z direction. This means that the chambers of the intermediate piece are designed to be open upward and downward essentially in the direction of gravitational force. Along with low material usage, this provides for high strength of the intermediate piece, and therefore correspondingly high loads can be dissipated. The intermediate piece can be supported on the respective supporting pillar via the fastening body. For this purpose, it is possible for the fastening body to butt with surface-area contact against the associated supporting pillar and to be fastened to the supporting pillar, in particular by screw connection. However, rather than being configured in the form of a disk-like fastening plate, the fastening body here is configured in the form of a hollow body with a chamber profile having a plurality of chambers. The chambers of the fastening body here run essentially in the Y direction. This means that the chambers of the fastening body are configured to be open in the transverse direction of the motor vehicle. In comparison with some parts present which are oriented possibly in the X direction and/or in the Z direction, a surface normal of the opening cross section of the respective chamber of the fastening body is oriented predominantly in the Y direction. The intermediate piece can be supported on the end sides of the walls bounding the respective chamber and, by means of the intermediate piece, the loads which are to be dissipated can be introduced into the fastening body via the end sides oriented essentially in the Y direction. Elastic bending, in particular denting, of the fastening body under load is avoided as a result. Instead, a particularly high level of rigidity is achieved, and this allows for even large loads to be dissipated. The strength of the fastening body can be determined essentially by the compressive buckling force of the walls of the chambers. The extent of the fastening body along the supporting pillar, which runs essentially in the Z direction, can be greater here than the extent of the intermediate piece in the Z direction, and therefore the loads which are to be dissipated, and are introduced into the fastening body, can be introduced into the associated supporting pillar with distribution over a correspondingly large surface area. The situation where the end sides of the chambers of the fastening body push elastically or plastically into the material of the associated supporting pillar can be avoided as a result. Dissipation of high loads in a motor-vehicle body is made possible, along with straightforward installation capability of the crossmember arrangement in the motor-vehicle body, as a result of the fastening body of the crossmember arrangement, said fastening body being configured in the form of a chamber profile, running essentially in the Y direction.

An X direction is understood to mean a coordinate direction along a longitudinal axis of a motor vehicle, when the crossmember arrangement has been installed in the motor vehicle. The X direction runs essentially horizontally when the motor vehicle is positioned on a planar, horizontally running underlying surface. A Y direction is understood to mean a coordinate direction along a transverse axis of a motor vehicle, when the crossmember arrangement has been installed in the motor vehicle. The Y direction runs essentially horizontally when the motor vehicle is positioned on a planar, horizontally running underlying surface. A Z direction is understood to mean a coordinate direction along a vertical axis of a motor vehicle, when the crossmember arrangement has been installed in the motor vehicle. The Z direction runs essentially vertically when the motor vehicle is positioned on a planar, horizontally running underlying surface. The X direction, the Y direction and the Z direction are oriented orthogonally in relation to one another.

The crossmember arrangement can be installed in a motor vehicle configured in the form of a coupe, for the purpose of improving the side-impact protection. It is also possible for the crossmember arrangement to be installed in a convertible, in particular as a rollover bar serving to avoid injury to vehicle occupants when the vehicle rolls over. If the crossmember arrangement is to be installed in a motor vehicle configured in the form of a coupe, the intermediate piece can be provided at that location where, if the motor vehicle were configured in the form of a convertible, a bearing for a fold-away convertible top would be provided. This means that as many identical parts as possible can be provided for the coupe and convertible versions of a motor-vehicle model. The crossmember arrangement can be connected, for example, to supporting pillars, in particular B pillars, which extend only as far as the ledge or sill. In the convertible version, upwardly projecting bars can be connected to the crossmember in a region behind a driver and/or passenger seat, so that loads which occur when the vehicle rolls over can be withstood by the crossmember. The crossmember and/or the intermediate piece and/or the fastening body can be produced cost-effectively from a steel or an aluminum material, in particular by extrusion. The fastening body is connected to the crossmember merely indirectly via the intermediate piece. The crossmember can be fastened, in particular screwed, to the intermediate piece via a fastening device. The fastening device can realize, for example, compensation for tolerances in the Y direction.

In particular, the fastening body has at least one screw-connection chamber, in particular at least two screw-connection chambers, through which to guide a fastening means, in particular a screw. The screw-connection chamber can form an eyelet, through which the fastening means can be guided. The extent of the screw-connection chamber in the Y direction can correspond to the extent of the rest of the fastening body in the Y direction. On account of the therefore significant extent of the fastening body in the Y direction, it is also possible for the fastening means to be configured in the form of an expansion screw. The screw-connection chamber can have, in particular, an essentially circular opening cross section. The chambers in the fastening body other than the screw-connection chamber can have, in particular, a quadrilateral, in particular square, rectangular or trapezoidal opening cross section or a triangular opening cross section. The screw-connection chamber can provide for the fastening means to be roughly centered, as a result of which installation of the crossmember arrangement in relation to the respective supporting pillar of the motor-vehicle body is simplified.

The material of the fastening body which encloses the screw-connection chamber preferably forms a bearing surface for a screw head. The opening cross section of the screw-connection chamber can be selected such that the situation where the fastening means, configured in particular in the form of a screw, falls all the way through is avoided. A fastening-means head, which projects from a bolt or stem, can strike against the bearing surface of the fastening body, and therefore the fastening body can be easily clamped between the fastening means and the associated supporting pillar. The bearing surface is, in particular, of planar design, in order to allow the screw head to butt with surface-area contact against the bearing surface.

An amount of tolerance compensation in the X direction and/or in the Y direction is particularly preferably provided between the screw-connection chamber and the fastening means inserted in the screw-connection chamber. The screw-connection chamber is configured, for example, in the form of a slot or quadrilateral hole, of which the opening cross section is significantly larger than the cross-sectional surface area of the fastening means. The resulting play allows the fastening means to be easily fitted into the screw-connection chamber and to effect tolerance compensation in the X direction and/or in the Y direction. At the same time, the screw-connection chamber can be narrow enough to allow a head, in particular a screw head, to project beyond the entire circumference of the opening cross section of the screw-connection chamber and to strike against the material of the fastening body.

In particular, the extent of the screw-connection chamber in the Y direction is smaller than the extent of the rest of the fastening body, wherein in particular the extent of the screw-connection chamber in the Y direction corresponds essentially to the average wall thickness of the rest of the fastening body. The extent of the screw-connection chamber in the Y direction can be selected, in particular, such that, in the coupe version, the intermediate piece can replace a convertible-top bearing provided for the convertible version. The extent of the screw-connection chamber in the Y direction can be brought into line here with the material thickness necessary for establishing a reliable screw connection. The amount of material used for the fastening body and for the fastening means can be reduced as a result. In particular, the fastening means used can be a comparatively short screw. The production costs can be lowered as a result.

The intermediate piece is preferably inserted to some extent into a hollow chamber of the fastening body. This can result in a form fit between the intermediate piece and the fastening body in the X direction and/or in the Z direction. The strength and stability of the crossmember arrangement is improved as a result. In particular, a shoulder is formed between the part inserted into the hollow chamber and the rest of the intermediate piece, and said shoulder can act possibly as a stop which is effective in the Y direction, so as to limit the depth to which the intermediate piece is inserted in the fastening body.

The intermediate piece particularly preferably butts against two or four inner surfaces of the hollow chamber. If that part of the intermediate piece which is inserted in the fastening body butts against two hollow-chamber inner surfaces which are located opposite one another, this blocks movement of the intermediate piece relative to the fastening body in the direction of the surface normal of the opposite inner surfaces. This allows precise predetermination of the relative position in one or two coordinate directions. It is preferably the case that that part of the intermediate piece which is inserted in the fastening body, rather than being configured in the form of a circumferentially closed tubular extension, is configured in the form of separate extensions, in particular in the form of elongate noses or ribs, in order to achieve a form fit for force-transmission purposes.

In particular, the intermediate piece is connected to the fastening body via two weld seams which are spaced apart from one another in the X direction and run essentially in the Z direction, wherein in particular the intermediate piece is additionally connected to the fastening body via two weld seams which are spaced apart from one another essentially in the Z direction and run in the X direction. The weld seams which run in the Z direction can better withstand the loads which occur in the Y direction in the event of a side impact, and therefore rupturing of the connection between the intermediate piece and the fastening body can be avoided. If weld seams which run in the X direction are provided in addition, it is possible for the weld connection between the intermediate piece and the fastening body to be generated by a single, all-round weld seam.

The crossmember arrangement is preferably of symmetrical configuration. The crossmember arrangement can be configured in an axially symmetrical manner in relation to a longitudinally running center line of the motor vehicle. It is thus possible for identical production methods to be used for producing the intermediate piece and/or the fastening body and/or for identical parts to be used on the right and left for the intermediate piece and/or the fastening body. The production costs can be reduced as a result.

The invention also relates to a body for a motor vehicle, having a first supporting pillar for dissipating loads, said first supporting pillar being provided on the right and left in each case at a front end of a passenger compartment, having a second supporting pillar for dissipating loads, said second supporting pillar being provided on the right and left in each case between the front end and a rear end of the passenger compartment, and/or having a third supporting pillar for dissipating loads, said third supporting pillar being provided on the right and left in each case at the rear end of the passenger compartment, and having a crossmember arrangement, which can be designed, and developed, as described above, for dissipating loads in the Y direction, said crossmember arrangement being connected to the right-hand first supporting pillar and to the left-hand first supporting pillar and/or to the right-hand second supporting pillar and to the left-hand second supporting pillar and/or to the right-hand third supporting pillar and to the left-hand third supporting pillar. It is possible for the first supporting pillar to be an A pillar, for the second supporting pillar to be a B pillar and for the third supporting pillar to be a C pillar. Dissipation of high loads in a motor-vehicle body is made possible, along with straightforward installation capability of the crossmember arrangement in the motor-vehicle body, as a result of the fastening body of the crossmember arrangement, said fastening body being configured in the form of a chamber profile, running essentially in the Y direction.

BRIEF DESCRIPTION OF THE DRAWING FIGURE

The invention will be explained by way of example hereinbelow with reference to the accompanying drawing and by way of a preferred exemplary embodiment, wherein the features presented hereinbelow can represent an aspect of the invention both in each case individually and in combination. In the drawing.

DETAILED DESCRIPTION OF THE INVENTION

Figure 1:
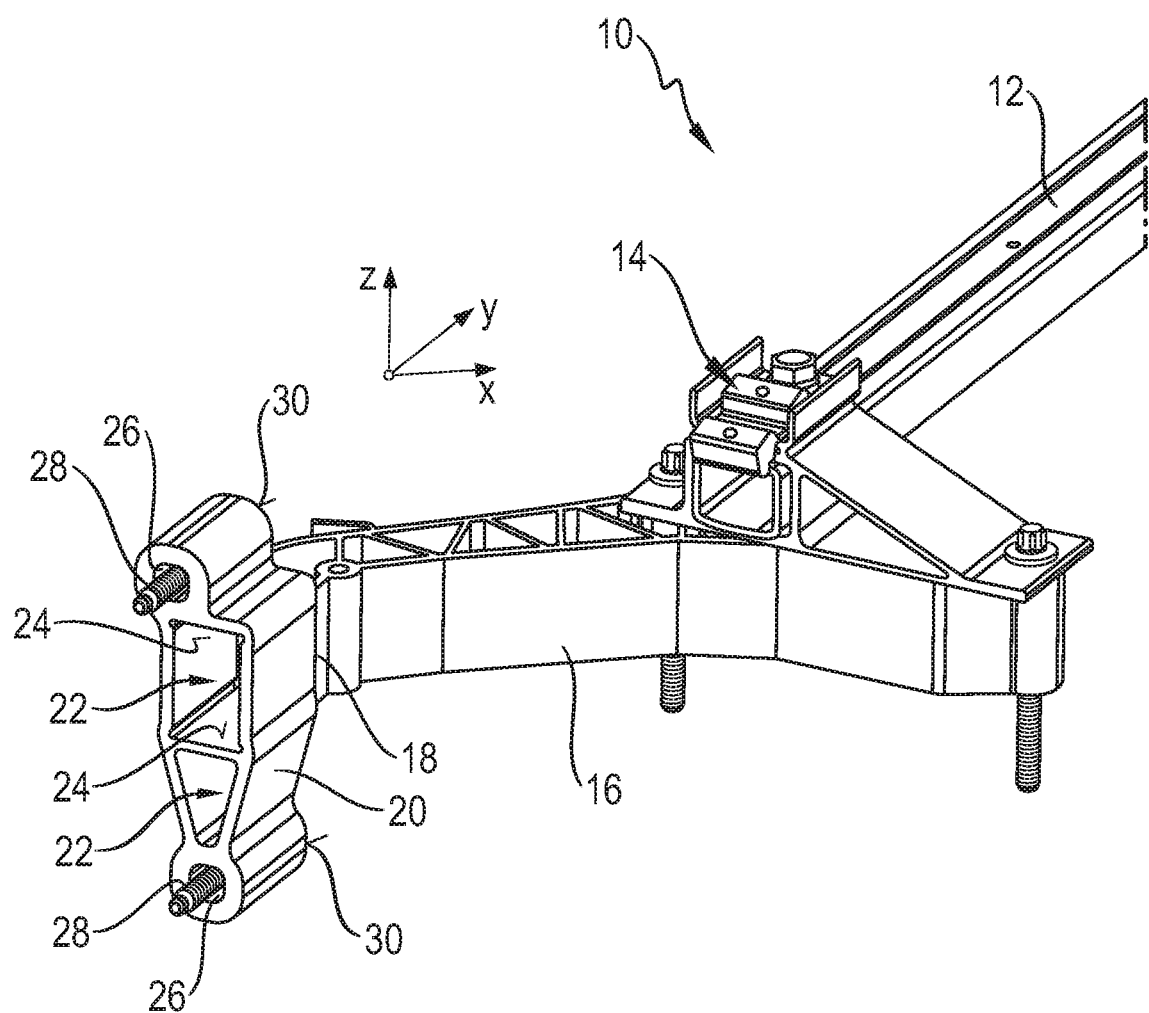
FIG. 1 shows a schematic perspective view of half of a crossmember arrangement provided for a motor vehicle configured in the form of a coupe.
Figure 2:
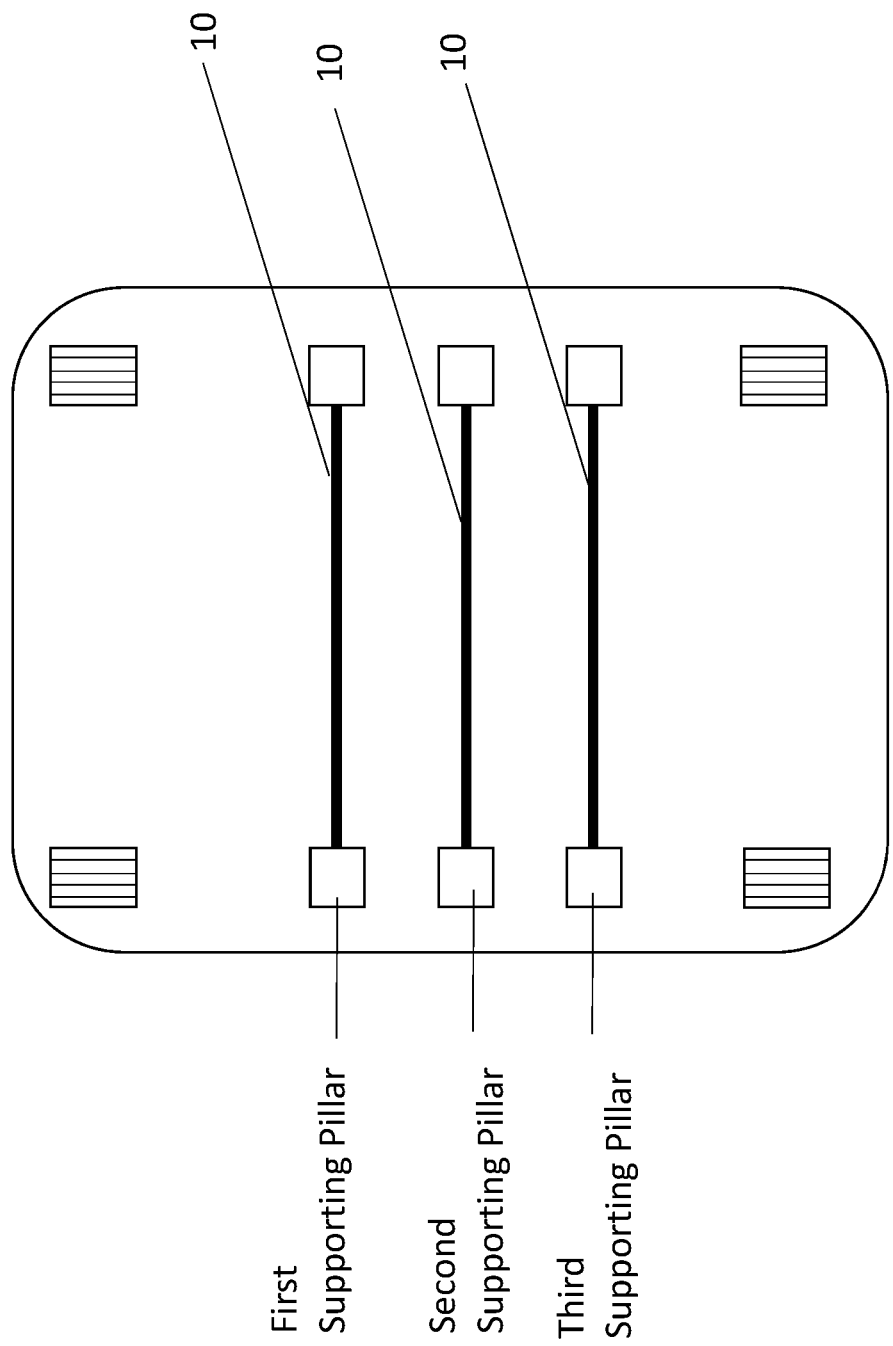
FIG. 2 depicts the motor vehicle.

The crossmember arrangement 10 illustrated in FIG. 1 can, for example, also be part of a rollover bar connected to two B pillars which are located opposite one another in a body of a motor vehicle configured in the form of a convertible. FIG. 2 depicts the motor vehicle.

The crossmember arrangement 10 can be configured in an axially symmetrical manner in relation to a center line of the motor vehicle. The crossmember arrangement 10 has a crossmember 12, which runs in the Y direction—in the transverse direction—of the motor vehicle and is fastened to an intermediate piece 16 via a fastening device 14. If the crossmember arrangement is to be installed in a motor vehicle configured in the form of a coupe, the intermediate piece 16 can be provided at the location where a convertible-top bearing is provided in a motor vehicle configured in the form of a convertible. The intermediate piece 16 is configured in the form of a multi-chamber profile, of which the chambers run vertically in the Z direction. The intermediate piece 16 is connected to a fastening body 20 via weld seams 18 which run in the Z direction.

The fastening body 20 is configured in the form of a chamber profile which runs in the Y direction. The intermediate piece 16 can be inserted, in part, into one of a plurality of hollow chambers 22 and can butt, in particular, against part, or against all the inner surfaces 24, of the hollow chamber 22. The fastening body 20 additionally has screw-connection chambers 26, which have for example a circular opening cross section. A respective fastening means 28 configured in the form of a screw is inserted, with a clearance fit, into each of the screw-connection chambers 26. In particular, in an embodiment which is not illustrated, it is possible to reduce the extent of the screw-connection chambers 26 in the Y direction. A bearing surface 30 can be formed on a side which is oriented toward the intermediate piece 16, it being possible for a head of the fastening means 28 to butt against said bearing surface. On a side which is oriented away from the intermediate piece 16, the fastening body 20 can butt with surface-area contact against the associated supporting pillar and, by means of said fastening body, the loads which are introduced via the crossmember 12 can be dissipated into the supporting pillar over a correspondingly large surface area. In particular, the fastening body 20 is screwed to the supporting pillar via the fastening means 28.

What is claimed:

1. A crossmember arrangement for reinforcing a motor-vehicle body, said crossmember arrangement comprising:
    a crossmember for dissipating loads in a Y direction,
    an intermediate piece connected directly or indirectly to the crossmember and configured for fastening the crossmember to at least one supporting pillar of the motor-vehicle body, and
    a fastening body connected to the intermediate piece and configured for butting against the supporting pillar, wherein the fastening body includes at least one hollow chamber which extends substantially in the Y direction, wherein a mounting portion of the intermediate piece is positioned within the hollow chamber of the fastening body.

2. The crossmember arrangement as claimed in claim 1, wherein the fastening body has at least one fastener-connection chamber which guides a fastener.

3. The crossmember arrangement as claimed in claim 2, wherein a material of the fastening body which encloses the fastener-connection chamber forms a bearing surface for a screw head.

4. The crossmember arrangement as claimed in claim 2, wherein an amount of tolerance compensation in an X direction and/or in the Y direction is provided between the fastener-connection chamber and the fastener inserted in the fastener-connection chamber.

5. The crossmember arrangement as claimed in claim 2, wherein an extent of the fastener-connection chamber in the Y direction is smaller than an extent of a remainder of the fastening body, wherein the extent of the fastener-connection chamber in the Y direction corresponds to an average wall thickness of the remainder of the fastening body.

6. The crossmember arrangement as claimed in claim 1, wherein the intermediate piece butts against two or four inner surfaces of the hollow chamber.

7. The crossmember arrangement as claimed in claim 1, wherein the intermediate piece is connected to the fastening body via two weld seams which are spaced apart from one another in an X direction and run substantially in a Z direction, wherein the intermediate piece is additionally connected to the fastening body via two weld seams which are spaced apart from one another in the Z direction and run substantially in the X direction.

8. The crossmember arrangement as claimed in claim 1, wherein the crossmember arrangement is of symmetrical configuration.

9. The crossmember arrangement as claimed in claim 1, wherein the supporting pillar is a B pillar.

10. The crossmember arrangement as claimed in claim 1, wherein the fastening body includes at least two hollow chambers which extend substantially in the Y direction.

11. A body for a motor vehicle, said body comprising:
 a crossmember arrangement as claimed in claim 1, wherein the at least one supporting pillar comprises:
  (i) first supporting pillars for dissipating loads provided on right and left sides, in each case, at a front end of a passenger compartment,
  (ii) second supporting pillars for dissipating loads provided on the right and left sides, in each case, between the front end and a rear end of the passenger compartment, and/or
  (iii) third supporting pillars for dissipating loads provided on the right and left sides, in each case, at the rear end of the passenger compartment, and
 wherein said crossmember arrangement is connected to a right-hand first supporting pillar and to a left-hand first supporting pillar and/or to a right-hand second supporting pillar and to a left-hand second supporting pillar and/or to a right-hand third supporting pillar and to a left-hand third supporting pillar.

12. The crossmember arrangement as claimed in claim 1, wherein the intermediate piece is directly connected to the crossmember.

13. The crossmember arrangement as claimed in claim 1, wherein the fastening body is directly connected to the intermediate piece.

14. The crossmember arrangement as claimed in claim 1, wherein the intermediate piece is directly connected to both the crossmember and the fastening body.

15. The crossmember arrangement as claimed in claim 1, wherein the cross member is offset from the fastening body in an X-direction, and the intermediate piece includes an angled portion that bridges the offset in the X-direction for interconnecting the cross member and the fastening body.

16. The crossmember arrangement as claimed in claim 1, wherein a mounting portion of the cross-member is positioned within a hollow chamber of the intermediate piece, wherein the hollow chambers of the intermediate piece and the fastening body extend in the same direction.

17. The crossmember arrangement as claimed in claim 16, wherein the hollow chamber of the intermediate piece is positioned at an elevation above the hollow chamber of the as viewed in a Z direction.

18. The crossmember arrangement as claimed in claim 1, wherein the cross member and the hollow chamber of the fastening body both extend in the Y-direction.

19. The crossmember arrangement as claimed in claim 1, wherein the fastening body, the cross member and the intermediate piece are separate components that are fastened together.

* * * * *